(No Model.)
D. H. DORSETT.
UNDERGROUND CONDUIT.
No. 322,529. Patented July 21, 1885.
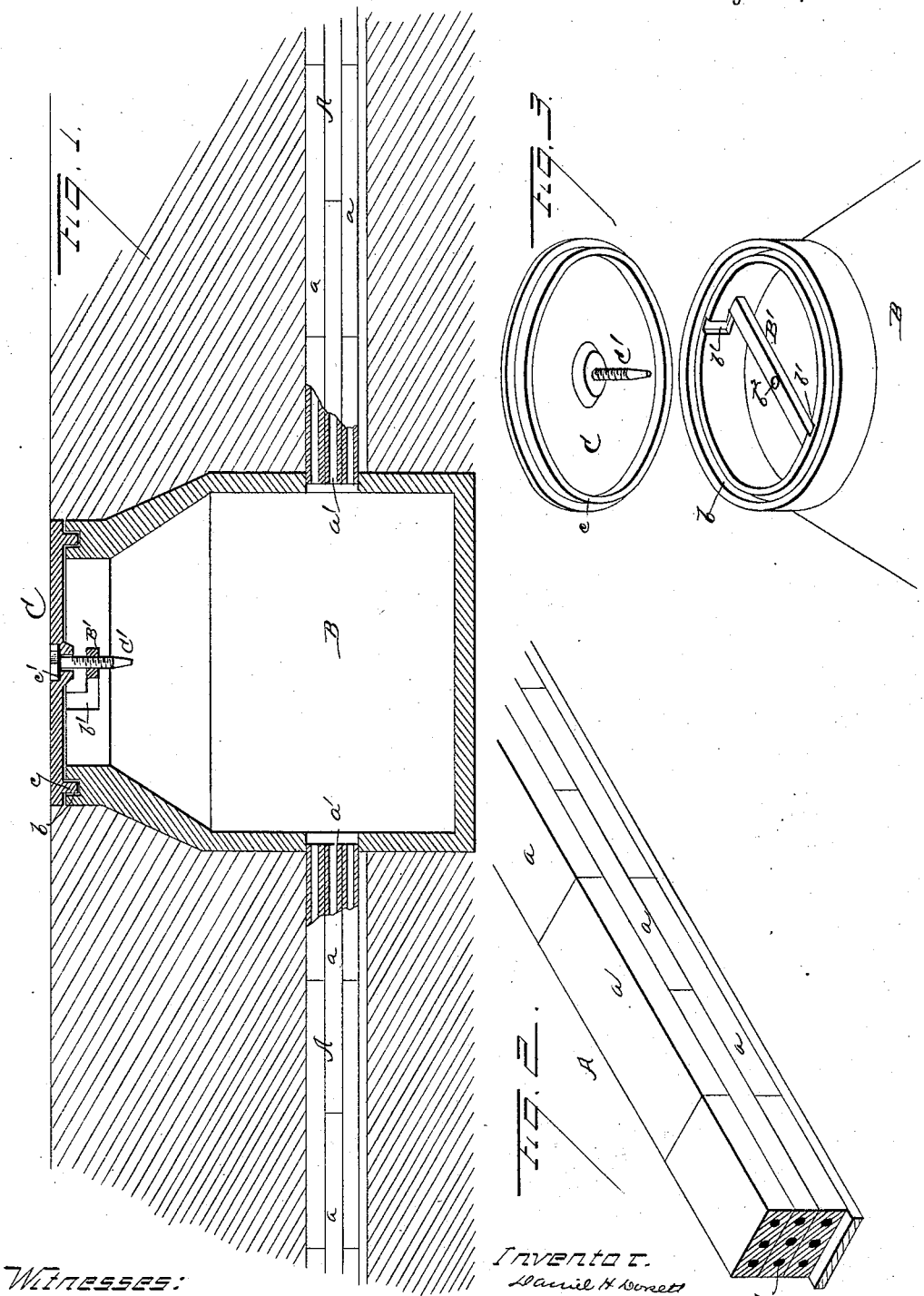

UNITED STATES PATENT OFFICE.

DANIEL H. DORSETT, OF CHICAGO, ILLINOIS.

UNDERGROUND CONDUIT.

SPECIFICATION forming part of Letters Patent No. 322,529, dated July 21, 1885.

Application filed August 22, 1884. (No model.)

*To all whom it may concern:*

Be it known that I, DANIEL H. DORSETT, a citizen of the United States, residing at Chicago, in the county of Cook and State of Illinois, have invented certain new and useful Improvements in Underground Conduits, of which the following is a specification, to wit:

This invention relates to an improvement in electrical conduits and man-holes therefor; and it consists in certain peculiarities of the construction and arrangement of the same, substantially as will be hereinafter more fully set forth and claimed.

In order to enable others skilled in the art to which my invention appertains to make and use the same, I will now proceed to describe its construction and use, referring to the accompanying drawings, in which—

Figure 1 is a view of my conduit system. Fig. 2 is a perspective view of the conduit, showing the manner of laying it; and Fig. 3 is a similar view of the man-hole and its cover.

A represents my conduit, which is formed of an asphaltum compound, and preferably of the particular one for which a patent was granted to me on May 6, 1884, No. 298,072. The conduit is formed in sections $a\ a$, of suitable length, having one or more openings, $a'$, running through them for the passage of electrical conductors, as clearly seen in Fig. 2, and the sections joined together in the manner usual in similar cases by a portion of similar material placed between their ends to cement them, and needs no illustration herein. In laying conduits it is often the case that while at first a small conduit, or one with a small number of passages only is needed, yet as business increases it is found necessary to take it up and replace it with a larger one at great expense; and to obviate this I form the sections of my conduit flat or rectangular in cross-section, and lay them in the trench one layer upon another, breaking joints, as in the drawings. This enables me at first to lay a small conduit for present needs, which may at any time be indefinitely extended or enlarged in capacity by simply opening the trench and laying one or more lines of sections upon the original conduit.

At suitable points I place man-holes B, as shown in Figs. 1 and 3. These are constructed of the same non-conducting compound as the main body of the conduit, and in its upper edge is formed an annular groove, $b$, and in each side at the top an L-shaped slot, $b'$. In this slot is placed an iron cross-bar, B', having a hole, $b^2$, through its center. The cover C of this man-hole is formed with an annular flange, $c$, fitting the groove $b$ in the man-hole, and the center of the cover is provided with a locking-bolt, C', having its head recessed in the cover and resting upon a rubber gasket, $c'$, to exclude moisture. When this conduit is laid and the wires drawn through it, the covers C are placed over the man-holes, and thin flanges fitting into the grooves, as in Fig. 1, effectually exclude the moisture; and a rubber gasket may be added, if found desirable, when water is liable to collect over the cover. The bolt C' is screwed into the bar B' and locks the cover securely in place; the rubber washer $c'$ preventing any moisture from entering around the bolt. This forms a conduit system of comparatively inexpensive first cost, which may at any time be enlarged as business demands, and which is at all times accessible by means of the man-holes to examine or repair the wires.

I desire to construct this conduit of the peculiar shape I have shown and described of any non-conducting compound, but prefer that patented to me, as previously stated, as being more suitable for the purpose.

Having thus fully described my invention, what I claim as new, and desire to secure by Letters Patent, is—

An asphaltum concrete man-hole for underground conduits for electrical wires, formed with a circumferential groove in its upper edge, and provided with a cross-bar secured in L-shaped recesses therein, in combination with a cover having a circumferential flange, and a locking-bolt passing through its center into the cross-bar, substantially as and for the purpose set forth.

In testimony whereof I affix my signature in presence of two witnesses.

DANIEL H. DORSETT.

Witnesses:
W. C. MCARTHUR,
A. S. PARÉ.